Nov. 13, 1951 H. A. STICKEL 2,575,198

SELECTIVE SIGNAL RECEIVING DEVICE

Filed July 22, 1950 4 Sheets-Sheet 1

INVENTOR,
HAROLD A. STICKEL
BY Oswald H. Milmore
HIS ATTORNEY

Nov. 13, 1951 H. A. STICKEL 2,575,198

SELECTIVE SIGNAL RECEIVING DEVICE

Filed July 22, 1950 4 Sheets-Sheet 2

INVENTOR.

HAROLD A. STICKEL

BY

Oswald H. Milmore

HIS ATTORNEY

Nov. 13, 1951

H. A. STICKEL 2,575,198

SELECTIVE SIGNAL RECEIVING DEVICE

Filed July 22, 1950

4 Sheets-Sheet 3

INVENTOR,
HAROLD A. STICKEL
BY Oswald H. Milmore
HIS ATTORNEY

SELECTIVE SIGNAL RECEIVING DEVICE

Filed July 22, 1950 4 Sheets-Sheet 4

INVENTOR,
HAROLD A. STICKEL
BY Oswald H. Milmore
HIS ATTORNEY

Patented Nov. 13, 1951

2,575,198

UNITED STATES PATENT OFFICE 2,575,198

SELECTIVE SIGNAL RECEIVING DEVICE

Harold A. Stickel, San Francisco, Calif.

Application July 22, 1950, Serial No. 175,411

17 Claims. (Cl. 177—353)

This invention relates to selective signal receiving devices of the type suitable for operation by electrical signals in the form of integers. It is particularly applicable for conditioning a control element, such as an operating element of an electrical switch or a mechanism, at a remote station to energize a visual or aural signal device or to perform some function upon the reception of a predetermined code made up of one or more integer signals, e. g., in multi-party telephone networks, in radio networks wherein one or several of a group of radio receiving stations tuned to a common transmitting station is/are to be called, or for the remote control of various mechanisms.

The term "integer signal" is herein used to denote a signal made up of a sequence of rapidly recurring cycles of current changes the number of which is determined by the integer being transmitted; thus, the number of cycles may be equal to the value of the integer or to a multiple thereof or to a constant number added to the integer or to its multiple, etc., the integer zero being transmitted by a definite number of cycles different from that used for any other integer. The frequency of recurrence of the cycles of current change will depend upon the type of installation in question and may, for example, be of the order of ten per second in the case of dial-controlled circuits and of the order of one for every one or two seconds in the case of magnet generator-controlled circuits, wherein the electrical currents are generated by turning a crank manually and intermittently. The time intervals between successive current changes are usually substantially uniform throughout the integer signal but this is not essential; as will appear hereinafter, considerable variations in the durations of the individual impulses or interruptions of the current can be tolerated because it is the number and not the lengths of the impulses or interruptions that determines the integer. Individual integer signals within a composite code are separated by pauses which are longer than the intervals between current changes within a single integer signal.

The invention is applicable both to "closed type" circuit operation and to "open type" circuit operation. In the former the circuit is closed and energized prior to the transmission of a signal (either continuously or only immediately prior to a transmission) and also during the pauses between successive integer signals of a composite code group, and the current changes are effected by opening the circuit or otherwise reducing the voltage to decrease the current flow a number of times depending upon the integer. Such changes are herein referred to as interruptions, although the flow of current may not cease completely. In the latter operation, the circuit is open or de-energized or carries only a small current prior to the transmission of a signal and during the pauses between integer signals, and each integer signal is transmitted by applying a succession of electrical impulses to the circuit to create or increase the current flow a number of times. Although either type of operation may be employed in most installations, closed circuit operation is more commonly used with dial telephone equipment having a central source of electrical power and open circuit operation is more commonly used in telephone systems utilizing magneto generators and in radio networks wherein the current changes are effected by intermittently modulating a radio frequency carrier wave or by intermittently a continuous wave.

The permutations of integers of even reasonably low values, taken two or three at a time, are sufficiently numerous to afford a great many different codes. For example, 9,261 different codes are possible by combining three integers not exceeding the value twenty. However, in prior receiving instruments only a limited number of these codes could be usefully employed for selectively actuating receivers connected to a common transmitter because the selector mechanism were such as to respond to more than one code. In my copending patent application Ser. No. 86,250, filed April 8, 1949, I have disclosed an improved selective signal receiver wherein the possibility of response to more than one code group can be obviated and a full utilization of the possible permutations of integers is possible in assigning codes.

The present invention is directed to further improvements in such devices and has for a general object the provision of a selector which has fewer parts and is simpler to construct and service. Further objects are to arrange the parts so that the mechanism will operate efficiently without delicate adjustment and is rugged and better adapted for use in mobile equipment.

In the embodiments disclosed in the aforesaid prior patent application a serrated or toothed code plate was advanced step-by-step from an initial position against the force of a spring by a propelling pawl which was reciprocated a number of times in accordance with the number of cycles of current change in the signal and the mechanism was arranged to make the first propelling stroke of the pawl in each integer signal longer than the subsequent strokes of the same integer signal. The plate was provided with one or more blocking deflectors at various blocked positions on the plate for preventing the propelling pawl from entering the serrations when one of these deflectors was opposite the propelling pawl, and the blocked positions were located to be opposite the pawl whenever one more than the correct number of strokes had been made by the propelling pawl; this prevented the plate from being advanced more than one step beyond the position corresponding to the reception of the correct integer signal, regardless of the value of the integer signal. At the end of a correct integer signal the plate was, therefore, brought to rest with the propelling pawl opposite a point one step short of a blocked position on the plate, so that the pawl was able to enter a serration upon making the first stroke of the next integer signal; because this first stroke was longer than the others it advanced the plate sufficiently to move the blocked position past the pawl, thereby permitting subsequent strokes of the pawl in the said next signal to be effective for continued stepwise advancement of the plate. The plate was provided with a retaining pawl for holding the plate in an advanced position after each propelling stroke and the retaining pawl was released at the end of each integer signal to free the plate for return to its starting position except when the plate was, at the end of such signal, advanced exactly to one of several predetermined positions.

Now in accordance with the present invention it was found that the operation and construction of such devices can be simplified and improved and that fewer parts can be employed by using the propelling pawl only for advancing the code plate up to or forwardly from the blocked positions, i. e. without moving the plate past a blocked position, and providing an auxiliary driving member for advancing the code plate past such blocked position when a correct integer signal was received. As a result of this arrangement the successive strokes of the propelling pawl may be of equal lengths and the plate may be advanced in equal steps, thereby simplifying the construction of the pawl actuating mechanism; it is evident, however, that the instant invention is also adapted for operation with strokes of unequal lengths, as in the earlier device. The auxiliary driving member need not perform the function of advancing the code plate after the completion of the last integer signal of a code group particularly when, as in one of the embodiments to be described, the blocking means is omitted from the part of the plate which is near the propelling pawl at the completion of the code group. The omission of this final blocking means and of the last operation of the auxiliary driving member are, of course, optional.

In this specification frequent reference is made to various positions of the plate and positions on the plate. With regard to positions of the plate, any position to which the plate is advanced when the propelling pawl has completed the correct number of propelling strokes within any integer signal corresponding to the construction or adjustment of the plate, is designated as an "A" position; thus, there are as many "A" positions as there are integer signals in the composite code. The positions of the plate in which the propelling pawl is ineffective to advance the plate are designated as blocked or "B" positions; there is a "B" position beyond every "A," except that there need be no "B" position for the last "A" position, as was noted in the foregoing paragraph. "B" positions are preferably spaced from the "A" positions by only short distances, e. g., by a distance equal to one step of the plate (usually equal to one tooth interval), to limit the extent to which the plate will override the "A" position when too great an integer signal is received, although other spacings between the "A" and "B" positions may be used. The positions to which the plate is advanced by the auxiliary driving member are designated as the "C" positions; it follows that each "C" position is beyond a corresponding "A" position by a distance equal to the advance of the plate caused by one operation of the auxiliary member. Each "C" position is, of course, beyond the corresponding "B" position. The distance between the "A" and "C" positions is usually greater than the length of the steps effected by the propelling pawl, although the invention is not limited to any specific length for the step caused by the auxiliary driving member, the only requirement being that the plate be advanced beyond the blocked position to permit the propelling pawl once again to enter the serrations and advance the code plate when a subsequent integer signal is received. As regards positions on the plate, the same letters designate positions which are opposite the propelling pawl at the corresponding positions of the plate.

Any suitable blocking means may be provided for rendering the propelling pawl ineffective at each "B" position of the plate. I prefer to provide blocking means on the plate itself at the various "B" positions thereon. These means may take the form of caps fitted with deflectors covering the face of one or more teeth or serrations, which caps may be either permanently or adjustably mounted on the plate; or the blocking means may take the form of smooth portions separating groups of teeth or serrations. Both of these types are described in the aforesaid patent application.

A retaining pawl is provided for holding the plate in advanced position against the force of a biasing force, e. g., a spring, urging the plate for retrograde movement to a starting or initial position. The retaining pawl holds the plate after each forward step of the plate caused by a stroke of the propelling pawl, and may optionally also hold the plate after an advancement caused by the auxiliary driving member. A mechanism is provided for releasing the pawl at the completion of each integer signal to free the plate for return to the starting position at least when the plate was not advanced exactly to an "A" position; the pawl need not be released when the "A" position was reached, although release of the pawl in this instance would, in the mechanism to be described hereinafter, not be objectionable because the auxiliary driving member itself engages the plate and moves it to a "C" position and then holds it there until the next integer signal causes further advance of the plate. It is evident that the plate will be returned to starting position whenever the integer signal is too small or too great to advance the plate exactly to an "A" position.

At the completion of the last integer signal of a composite code the plate is in the final "A" position, which may according to one embodiment, be the ultimate or operating position of the plate; according to another embodiment the auxiliary driving mechanism advances the plate beyond the last "A" position to a final "C" position, which then is the ultimate position. In the ultimate position the plate is in condition to close an electrical contact or to actuate some other mechanical device for performing its signalling function. In the preferred embodiment to be described, this final signalling is effected by closing a switch having two contact elements: One element is a pin on the plate and the other is moved across the path of the pin at the completion of each integer signal so as to strike the pin only when the plate is stopped in the correct ultimate position. An optional feature, also shown in the illustrated embodiment, involves retaining the plate in the ultimate position for an extended period of time by preventing release of the retaining pawl when the switch elements come into engagement. The plate is thereafter returned to starting position by transmitting one additional current impulse or interruption, which releases the retaining pawl.

While the device is particularly designed for operation with composite codes containing a plurality of integer signals it is also useful for operation with single integer signals.

The motors for actuating the propelling pawl and the auxiliary driving member may be of any suitable type and the mechanisms described above are not restricted to any specific arrangements. I prefer to make use of electromagnetic devices of the type indicated in the aforesaid patent application, which comprise a fast-acting armature connected to the propelling pawl for reciprocating the pawl in synchronism with the changes in the electrical current, and a slow-acting armature connected to the auxiliary driving member and to the retaining pawl to move these elements at the completion of each integer signal or at a short time after completion thereof.

Having thus indicated the general nature and objects of the invention, the best mode of applying the principle will be described by reference to the drawings forming a part of the specification and illustrating certain preferred embodiments by way of example and not by way of limitation, wherein.

A. *Description of first embodiment—Figs. 1–4*

Figures 1, 2, 3, 4:
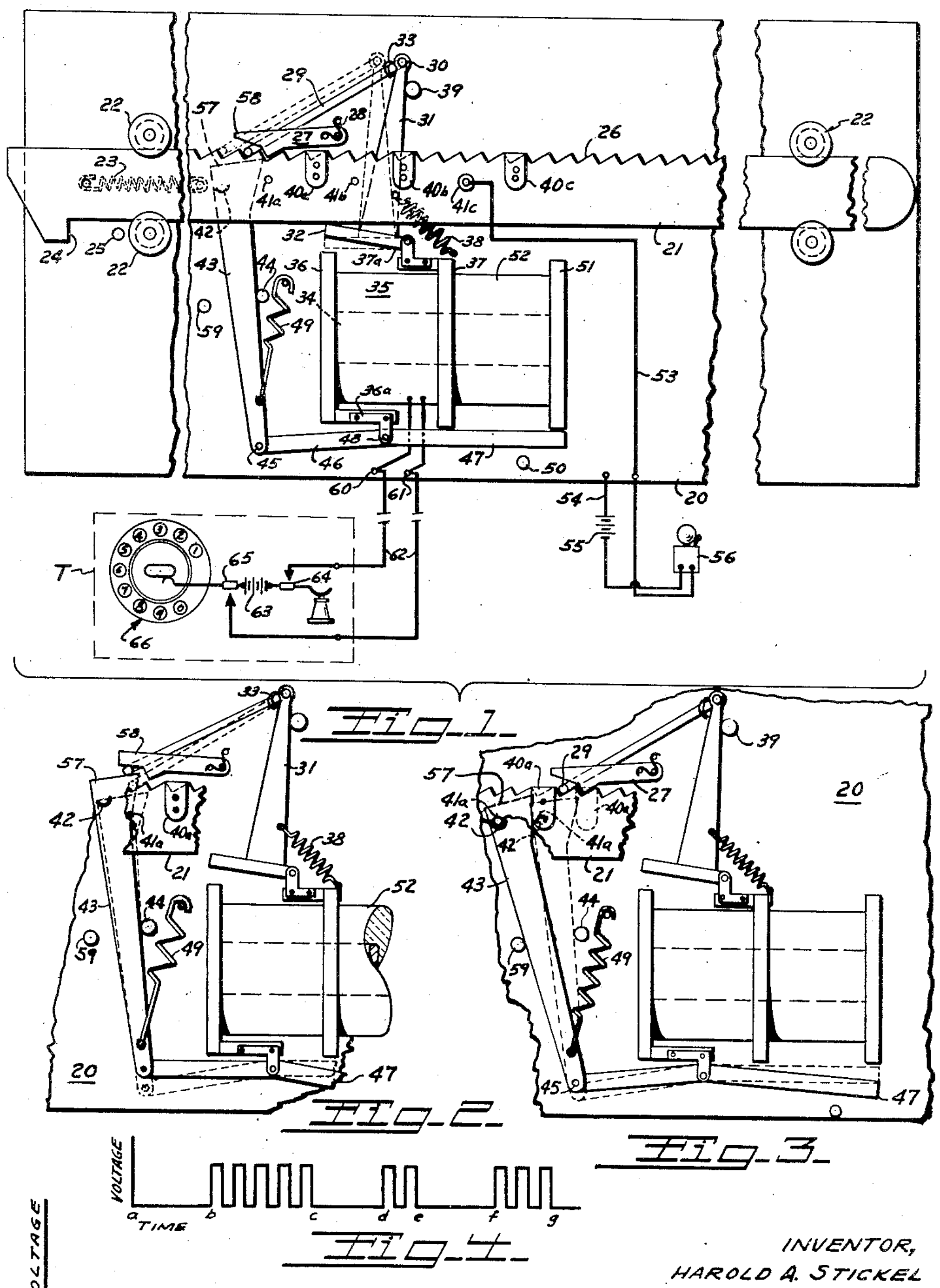
Fig. 1 is a diagrammatic plan view of a selector with the armatures in positions assumed during the reception of an integer signal, the operation being of the "open circuit" type.
Fig. 2 is a fragmentary view of the selector of Fig. 1 showing action when an incorrect signal was received.
Fig. 3 is a view similar to Fig. 2 showing the action when a correct signal was received.
Fig. 4 is a voltage diagram illustrating the signal used to actuate the selector of Fig. 1.

Referring particularly to Fig. 1, the selector is illustrated diagrammatically and parts have been spread out substantially in one plane to facilitate ready comprehension of the principle involved, it being understood that in an actual device the parts would be more closely assembled in the manner of the actual device illustrated in Figs. 8–14. The device has a support table plate 20 on which the code plate 21 is translatable, guided by four guide rollers 22. The plate is urged to a starting position toward the right by a spring 23; in the starting position shoulder 24 on the code plate engages stationary pin 25 which is carried by the table plate 20. The upper edge of the plate is serrated to provide a series of teeth 26. A retaining pawl 27 is pivotally mounted on plate 20 and urged toward counterclockwise motion by a spring 28 for holding the plate in advanced position (to the left from starting position) by engagement with the teeth thereof.

The plate is advanced toward the left stepwise by a propelling pawl 29 the left end of which is bent upwards and adapted to enter the notches between the teeth successively. The pawl 29 lies between the plate 20 and pawl 27 and is pivotally mounted at 30 on an extension 31 of an armature 32 and is urged against the edge of the code plate by a spring 33. The main part of the armature cooperates with an electro-magnet having a core 34, a solenoid winding 35, and magnetically permeable plates 36 and 37. A bracket 37a on the plate 37 affords a pivotal support for the armature, which is normally positioned in non-attracted position by a spring 38, with the propelling pawl retracted in the position shown in solid lines; this moves the arm 31 against a fixed stop pin 39 to limit the retraction stroke of the propelling pawl. When the winding 35 is energized a magnetic circuit is established through the core 34, the plates 36 and 37, bracket 37a, and the armature 32, thereby attracting the latter to the dotted line position and moving the propelling pawl to the left. This advances the code plate one step (equal to one tooth interval) to the left when the pawl 29 is engaged with a tooth at the beginning of the stroke. Immediately upon the cessation of the current in the winding the magnetic field collapses and the armature is returned by its spring 38 to the solid line position, thereby retracting the propelling pawl. Pawl 27 holds the plate advanced when pawl 29 is retracted. The armature is, therefore, a "fast acting" armature which moves in synchronism with current changes in the winding.

The code plate carries three blocking deflectors 40a, 40b and 40c; they are located at the three "B" positions, as previously defined. The third deflector is optional and may be omitted or even located beyond the third "C" position, merely to prevent the code plate from being advanced too far beyond the ultimate position. These deflectors have the parts thereof near the teeth offset upwardly from the code plate so as not to interfere with the action of the retaining pawl 27. These parts span one notch between teeth and the edges thereof are engaged by the upturned left end of the propelling pawl to prevent entry thereof into the blocked notches. When the plate is positioned with one of the blocking deflectors opposite the left end of the pawl 29 when the latter is retracted, the pawl slides over the deflector without advancing the plate when the armature 32 is attracted.

The code plate is shown set to receive a code consisting of the integers 4—1—2, i. e., having a sequence of integer signals containing five, two and three current impulses, respectively; the reason for the extra impulses will be explained later. It will be noted that there are five notches between the left end of the serrations and the first deflector 40a, which blocks the sixth notch;

three notches between the deflectors 40a and 40b; and four notches between the deflectors 40b and 40c. The "C" positions on the plate are the notches immediately to the right of each of these deflectors.

The code plate carries three pins 41a, 41b and 41c, extending downwardly and located so that one pin is opposite the concave engagement face or driving toe 42 of the auxiliary driving member 43 in each of the three "A" positions of the plate 21 when the member 43 is in its normal position against the stop pin 44. This driving member is disposed below the plate 21 and the toe 42 extends upwards toward the plate. The driving member is afforded pivotal support by pin 45 carried near the end of an extension 46 of a slow-acting armature 47 which has a pivotal support at 48 on a bracket 36a. The member 43 is urged to its normal position against the pin 44 by a spring 49, the abutment and one end of the spring being secured to the plate 20. The spring 49 performs a second function of urging the armature 47 toward its non-attracted position (shown in solid lines in Fig. 2) against a stop pin 50. The core of the electromagnet extends to the right beyond the transverse plate 37 to another transverse plate 51 of high magnetic permeability and the part of the core between plates 37 and 51 is surrounded by a lug 52, such as a ring of conductive material, e. g., copper; this lug influences the magnetic flux in the part of the core within the lug so that the flux breaks down slowly after the winding 35 is de-energized. When this winding is energized a magnetic circuit, in addition to that previously described, is established through the part of the core within the lug, the plates 37 and 51, and the armature 47, whereby the latter is attracted to the position shown in Fig. 1. When the electric current in the winding is interrupted this magnetic field decays slowly and the armature 47 remains attracted for a brief period, e. g., from a quarter of a second up to one second after the armature 32 is released. As a result of this slow-release action the armature 47 will be attracted during the first electrical impulse of an integer signal and will not be released in the intervals between consecutive, rapidly recurring impulses. It is, of course, immaterial how long each electrical impulse is held and whether they be of the same durations; the only requirement is that the intervals during which the winding 35 is de-energized be short enough to prevent release of the armature 47 to the solid line position shown in Fig. 3.

The third pin 41c is electrically insulated from the plate 21 and is electrically connected to a wire 53; it forms one contact element of an electrical switch, the other element of which is the toe 42 of the driving member 43. The latter is grounded to the plate 20, to which a wire 54 is connected. It is evident that any controlled circuit may be connected to the wires 53 and 54 at the remote station; for example, to produce an aural signal there may be a battery 55 and signal device, e. g., a buzzer or bell 56 which will sound whenever the pin 41c is engaged by the driving member 43.

The driving member 43 has a heel or release engagement part 57 disposed to be in alignment with the driving pawl near the forward end of the latter when the driving member is in engagement with the abutment 44. The driving member is of such length that when the armature 47 is released to the position of Fig. 2 it will engage the side of the propelling pawl and push it away from the code plate 21. It will be noted that the retaining pawl 27 has an extension 58 disposed away from the plate 21 and that the upturned end of the propelling pawl moves between this extension and plate 21. When the slow-acting armature 47 is released and the driving toe 42 does not engage one of the pins 41a—41c the driving member 43 moves upwards, sliding along the abutment pin 44 under the influence of the spring 49 and the heel 57 pushes the propelling pawl away from the serrations on the plate 21; this pawl, in turn, engages the extension 58 of the retaining pawl, thereby rotating the latter away from the serrations and freeing the plate 21 to return toward the right under the influence of its spring 23 to its starting position. When, however, the toe 42 is in alignment with one of the pins 41a—41c (i. e., when the plate 21 is in an "A" position) at the time that the slow-acting armature is released, the driving member engages the pin in question and advances the plate toward the left to the next "C" position. In this connection it should be noted that the line joining the toe 42 and the pivot pin 45 is not perpendicular to the direction of travel of the plate 21 but is inclined with the toe 42 displaced in the direction of the forward advance of the plate. Because of this the driving member urges the plate toward the left when the slow-acting armature is released and pivots in a clockwise direction about its pivot 48. In thus advancing the plate the driving member 43 also pivots about pivot pin 45 and moves away from the abutment pin 44 and against an abutment pin 59 which limits the advance of the plate to a distance of two toothed intervals; the heel 57 is thereby moved ahead of the propelling pawl, so that the propelling pawl and retaining pawl are not engaged thereby but remain engaged with the code plate.

The winding 35 has its terminals 60 and 61 connected to the line 62 leading to a transmitting station indicated diagrammatically at T. This station may have any suitable means for transmitting a code such as, for example, an electric battery 63 connected to a normally open switch 64 which is automatically closed when a telephone receiver is removed from its support, and a normally-open dial-controlled switch 65 which will close the circuit in rapid succession a number of times in accordance with the integer position to which the dial of dial mechanism 66 is rotated prior to release. The dial is constructed to close the switch a number of times which exceeds by one the number of the integer, and the digit "0" is transmitted by closing the switch eleven times.

B. *Operation of the first embodiment*

The correct code for this plate is 4—1—2. The device is initially de-energized and the code plate 21 is in its starting position at the right, with shoulder 24 in engagement with pin 25 and the propelling pawl 29 and retaining pawl away from the plate 21. When the receiver at the transmitting station T is lifted switch 64 is closed but the line 62 remains de-energized, as indicated at *a* in Fig. 4. The dial is then turned to the first number of the code and released; on the return of the dial it closes the switch 64 a number of times equal to the said number plus one. Thus, in the example here illustrated, the first integer of the code is "4"; hence when "4" is dialled there will be five impulses, as shown between points *b* and *c* in Fig. 4. When the first of these impulses is received at the winding 35 both armatures 32 and 47 are attracted, causing the propelling pawl 29 to make a stroke to the left (to the dotted line position) and retracting the auxiliary driving member 43. The propelling pawl was, however, initially away from the serrations of the plate 21, so that the plate is not advanced during the first stroke. At the end of the first stroke the retaining pawl 27 is in operative position against the plate 21. When the current is interrupted following the first impulse the armature 32 is released and the pawl 29 moves back to the right and there enters the first notch of the plate 21. The second impulse occurs before the magnetic field acting on armature 47 decays sufficiently to permit release of this armature; the propelling pawl thereupon make a propelling stroke and advances the plate 21 one step to the left, where it is retained by the pawl 27 when the propelling pawl is retracted following the completion of the second impulse. The plate is, accordingly, during the transmission of the first integer signal, advanced a number of steps one less than the number of current impulses transmitted, i. e., a number of steps equal to the integer transmitted (reckoning zero as having a value of ten), except that, as is explained below, the plate cannot be advanced beyond the "B" position.

Fig. 2 illustrates the effect of transmitting an integer signal which is too small, i. e., one which advances the plate only to a position in advance of its first "A" position. Assuming the integer "3" to have been received, at the cessation of the last impulse of the signal the plate is advanced three steps to the Fig. 2 position and, shortly after release of the armature 32 and retraction of the propelling pawl, the slow-acting armature 47 is released under the influence of the spring 49. This pushes the driving member 43 upwards and brings the heel 57 into engagement with the pawl 29, pushing it away from the plate 21. The pawl 29 in turn, engages the extension 58 of the retaining pawl to rotate the latter away from the code plate and permitting the latter to return to starting position under the force of its spring 23.

In the event that too great an integer is transmitted the plate is advanced to a position one step beyond its first "A" position, to the first "B" position, with the first deflector 40a opposite the end of the propelling pawl. Additional strokes of the pawl are ineffective to advance the plate beyond the "B" position because the end of the pawl cannot enter the notch between the teeth; hence the plate can be advanced only to the "B" position, regardless of how great an integer signal is transmitted. At the end of such an integer signal the slow-acting armature is again released and the plate is returned to starting position by the operations described in the foregoing paragraph.

Fig. 3 illustrates the effect of transmitting the correct integer signal, i. e., one which advances the plate exactly to the first "A" position, shown in dotted lines, with the first pin 41a in alignment with the toe 42 of the auxiliary driving member 43. When the slow-acting armature 47 is released the driving toe 42 engages the pin 41a and pushes the plate toward the left to the first "C" position, as indicated in solid lines. In this movement the member 43 rotates counter-clockwise about its pivot pin 45, leaving the abutment pin 44 and causing the heel 57 thereof to move out of alignment with the pawl 29. As a consequence the latter is not raised from the plate and the retaining pawl 27 remains in operative position. The member 43 engages abutment pin 59 at the end of this driving stroke. In thus advancing to the "C" position the plate moves past its first "B" position, i. e., the deflector 40a is moved past the end of the propelling pawl, so that the latter is in position to advance the plate when making the next stroke.

When the second integer signal is transmitted the events described above are repeated, with the difference that the propelling pawl, being now already in engagement with a notch in the plate 21, advances the plate already with the first stroke; hence the plate is, in all integer signals subsequent to the first, advanced by a number of steps equal to the number of current impulses, or one step more than the integer transmitted (reckoning the integer zero as ten), except that it cannot be advanced beyond a "B" position. The second integer signal is indicated between *d* and *e*, and the third signal between points *f* and and *g*, Fig. 4.

At the end of the third integer signal, assuming that all three integer signals were correctly transmitted, the driving member 43 engages the third pin 41c, thereby closing the signal circuit through the battery 55 to operate the signal device 56, and simultaneously advancing the plate to the last "C" position.

The plate 21 may then be returned to starting position by applying any signal, preferably one or two impulses, to the winding 35. Such impulse may be generated at the transmitting station T by dialing the integer one, or by any suitable circuit at the receiving station where the selective signal device is located e. g., automatically when the receiver is lifted from its support. Since such circuit for providing a single impulse to the winding after the station is called is not a part of the invention and the design thereof is well within the skill of persons versed in the art, it will not be further described.

Figure 6:
Fig. 6 is a voltage diagram illustrating the signal used to actuate the selector of Fig. 5.
Figure 5:
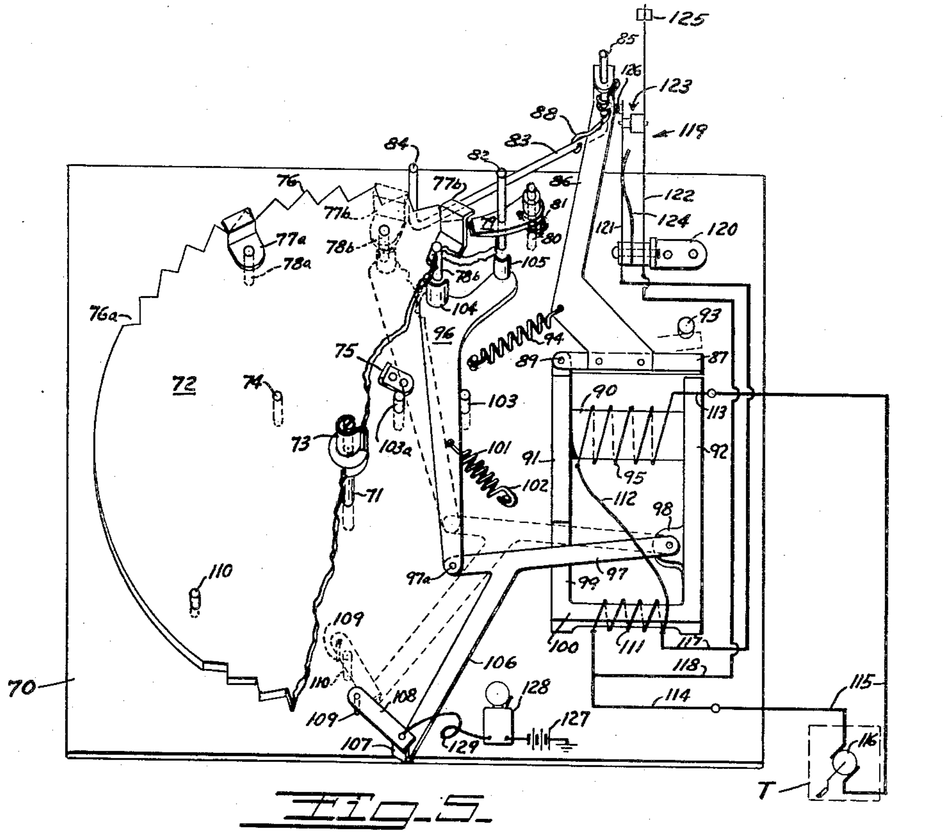
Fig. 5 is a diagrammatic plan view of a modified form of selector suitable for "closed circuit" type operation.
Figure 14:
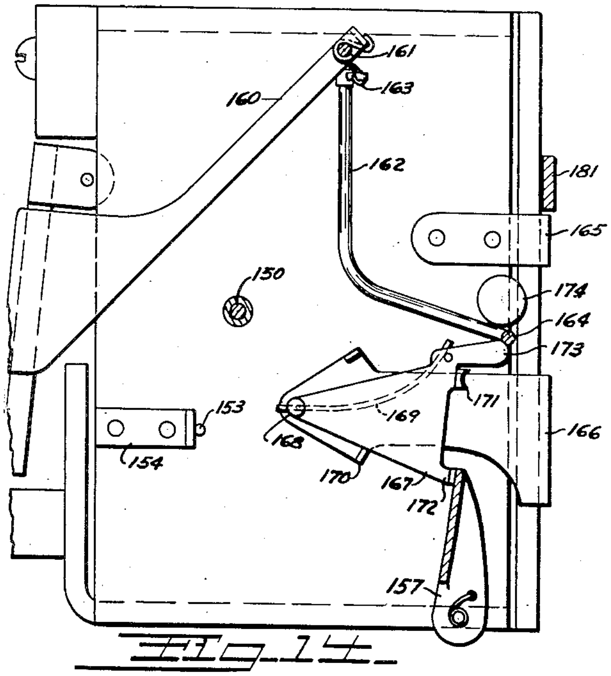
Fig. 14 is a plan view of parts of the mechanism with the code plate removed.
Figure 7:
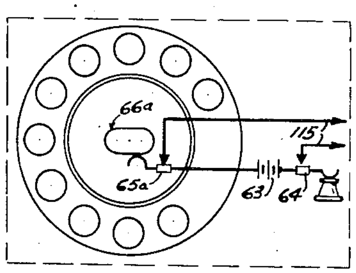
Fig. 7 is a circuit diagram for a modified transmitting station suitable for the embodiment shown in Fig. 5.
Figure 8:
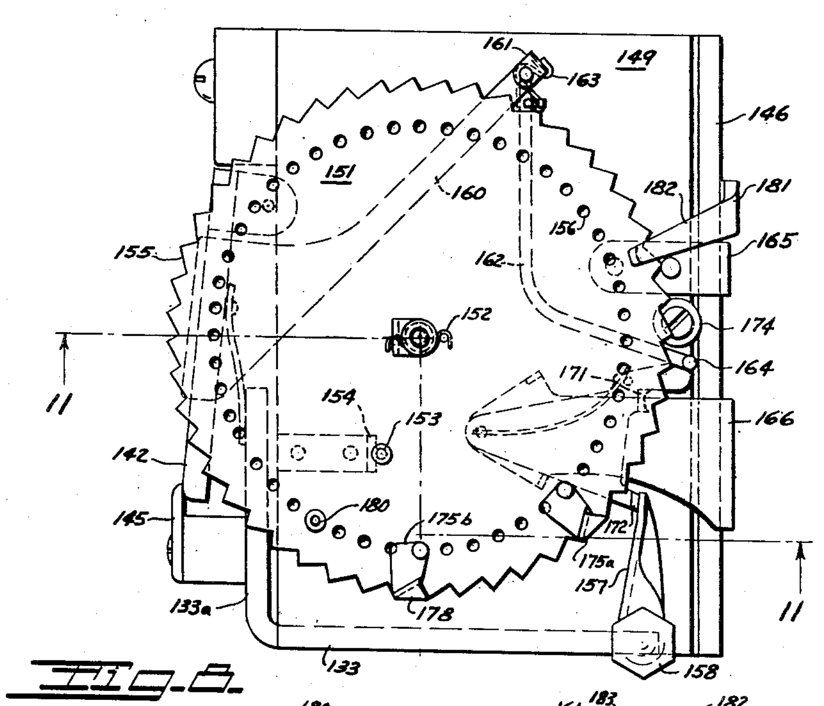
Fig. 8 is a plan view of a selector suitable for "open circuit" type operation.
Figure 9:
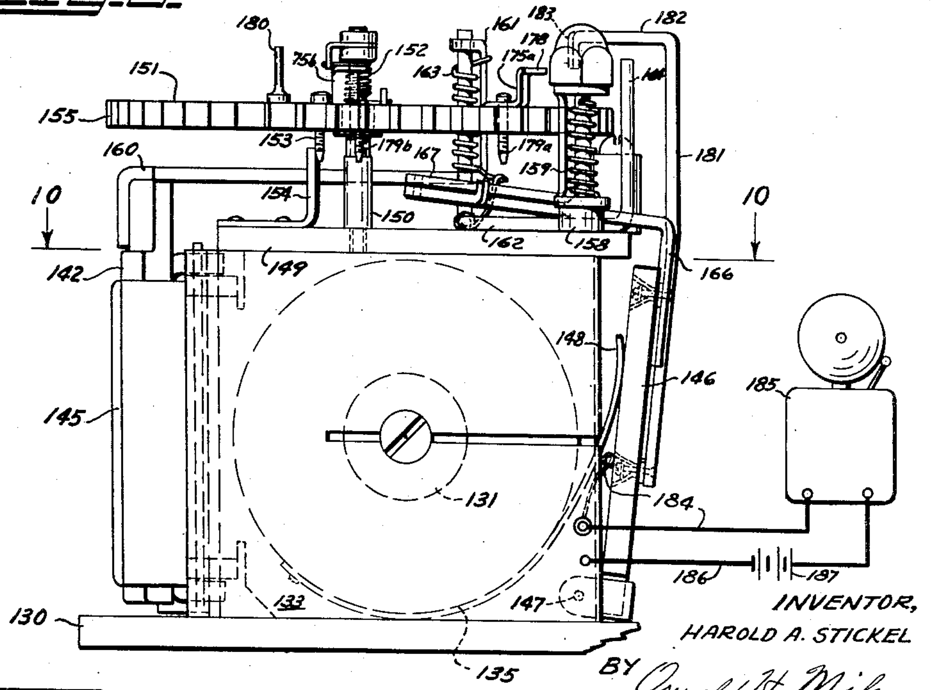
Fig. 9 is a front elevation view.
Figure 10:
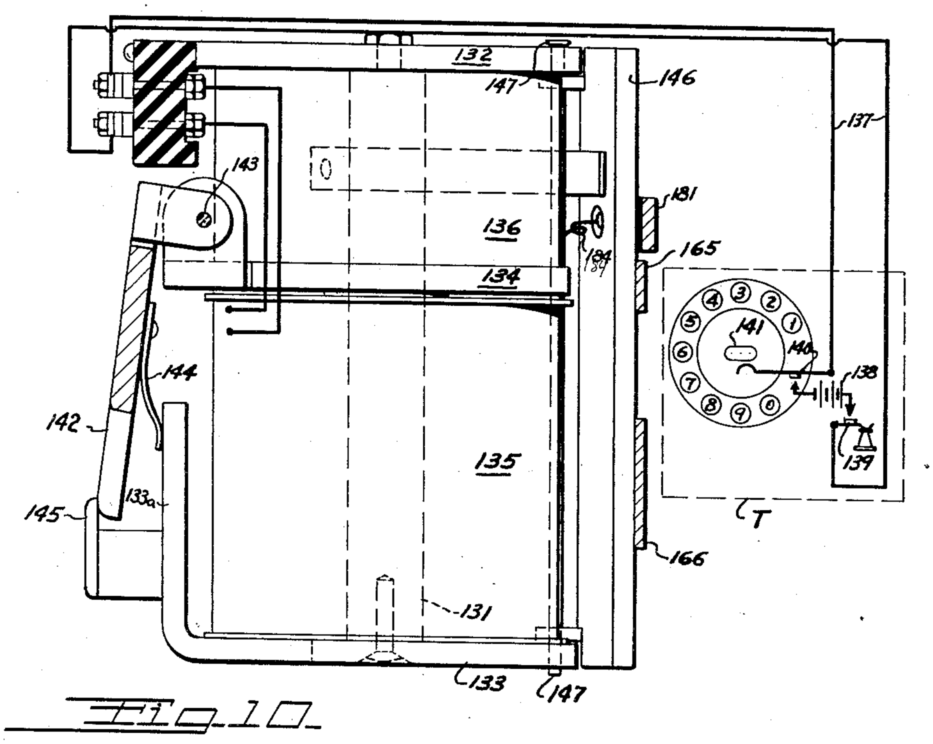
Fig. 10 is a horizontal sectional view taken on line 10—10 of Fig. 9.
Figure 11:
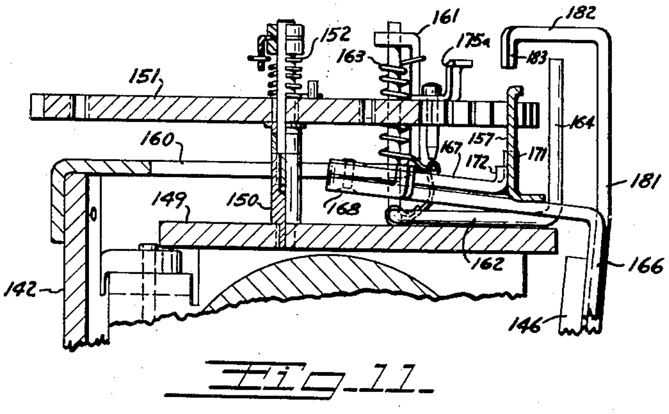
Fig. 11 is a sectional view taken on line 11—11 of Fig. 8.
Figures 12, 13:
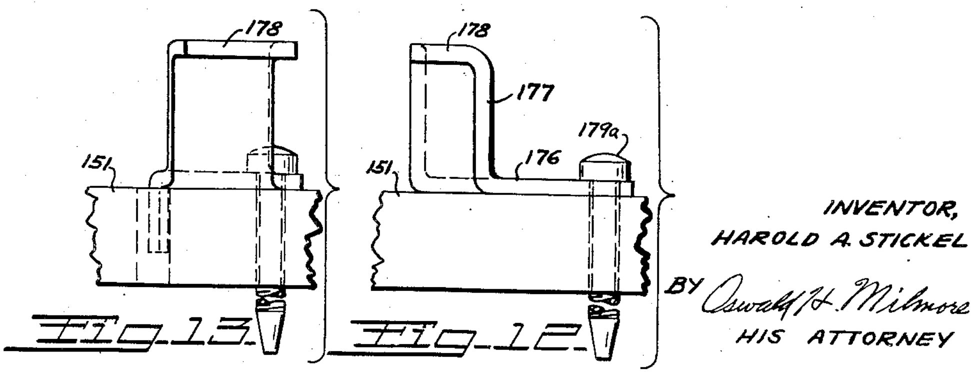
Figs. 12 and 13 are enlarged side and end views of a cap for blocking the plate.

C. *Description of second embodiment, Figs. 5, 6 and 7*

The embodiment illustrated in Fig. 5 uses a rotating disc for the code plate and is designed for closed circuit type operation, using a signal generator of either of the types illustrated in Figs. 5 and 7. Another feature of this embodiment is the provision of a slow-acting armature which acts far more slowly than that according to the other embodiments, making the device particularly suitable for use in installations using hand-operated magneto generator. In such installations the successive current changes within each integer signal are brought about by turning the generator crank a number of times in succession in accordance with a predetermined code, and each interruption or impulse may have a duration of from one to several seconds—which is longer than the decay time of a magnet using a lug of the type previously described if a magnet of reasonable size is to be used. While this special form of slow-acting armature is disclosed in connection with this second embodiment—the only embodiment intended for closed circuit type operation—it is evident that closed circuit operations may also be used with slow-acting armatures using lugs, a suitable arrangement therefor being, for example, described in the aforesaid prior patent application.

Referring to Fig. 5 in detail, there is shown a base plate 70 on which is fixed a vertical shaft 71 forming a journal for a rotatable, circular code plate 72 urged to rotate in a clockwise direction by a wound spring 73 to starting position; in the starting position a pin 74 on the lower side of the plate is in engagement with an abutment 75 mounted on the base plate. The drawing shows the code plate rotated ten steps to counterclockwise. The code plate has peripheral, equally spaced teeth 76. The teeth, as shown, are not symmetrical about radii to the center of the code plate, so as to facilitate driving engagement therewith of the propelling pawl in a counter-clockwise direction while permitting the pawl to slide over the teeth on the retraction stroke thereof. Two blocking deflectors 77a and 77b are mounted on the plate at angular position corresponding to the first two "B" positions on the plate; these deflectors are constructed as previously described for the deflectors 40a—40c and are secured to the plate by screws 78a and 78b, respectively, threadedly fixed in tapped holes in the plate and extending beneath the plate for cooperation with the auxiliary driving member.

A retaining pawl 79 is pivotally mounted on a pin 80 carried by the base plate and is shaped to engage the teeth 76 in succession, being urged counter-clockwise by a spring 81 to engage the code plate. A vertical pin 82 carried by the pawl extends both above and beneath the pawl. The propelling pawl 83 is in the form of a circular rod having the main, horizontal part at the level of the upper part of the pin 82 having the ends 84 and 85 thereof turned up. The latter end is pivotally supported at the end of an arm 86 of the fast acting armature 87 and the front end 84 is disposed to engage the teeth of the code plate and to extend to above the height of the blocking deflectors 77a and 77b so as to prevent driving engagement with the blocked notches when the plate is in one of the first two "B" positions. A spring 88, acting counter-clockwise against the code plate. The armature 87 is afforded pivotal support by a pin 89 for cooperation with an electromagnet having a first core 90 and two magnetically permeable plates 91 and 92; it is urged away from the magnet against a stop pin 93 by a spring 94. The core 90 carries a solenoid winding 95 which, when electrically energized, causes the armature to be attracted from the dotted line position to the solid line position.

The auxiliary driving member 96 is located between the base and code plates and is pivotally supported at 97a on the slow-acting armature 97 which is, in turn, mounted on a vertical pivot 98. This armature is free to swing about its pivot between the lower end of the plate 91 and a short extension 99 of a second core 100 which is shown to be integral with the plate 92. A spring 101, acting between a pin 102 on the base plate and the auxiliary driving member, urges the latter clockwise about point 97a against an abutment pin 103 and also urges the driving member to push the armature 97 in a counter-clockwise direction to the solid line position against the extension 99. A second abutment pin 103a limits the pivotal movement of the driving member away from pin 103. The driving member has an upturned driving toe 104 which is shaped with a concave engaging face for engaging the lower, protruding ends of the screws 78a and 78b when the code plate is in one of its "A" positions and the driving member is against the pin 103. The driving member further has a heel 105 with a concave engaging face located to engage the lower end of the pin 82 of the retaining pawl when the driving member is against the pin 103. The toe and heel are clear of the pins 78a, 78b and 82 when the slow-acting armature is in its normal, solid line position, thereby permitting free rotation of the code plate in either direction, but engages the appropriate pin when the armature is rotated clockwise. The armature 97 has an arm 106 extending beyond the edge of the code plate and having a vertical end 107 rising to above the code plate. A holding arm 108 is secured to the top of the end 107 and insulated electrically therefrom. The free end of the holding arm extends over the code plate and carries a depending contact and engaging pin 109. A pin 110 is fixed to the code plate at an angular position to be opposite the pin 109 when the code plate is in the third "A" position, and at a radial position to move freely radially inside of the pin 109 when the armature 97 is in its normal, solid line position, and to move freely radially outside of the pin 109 when the armature is in the dotted line position, against the plate 91. The radially inner face of the pin 109 is flat or concave to insure contact with the pin 110 when the armature 97 moves in a clockwise direction.

The second core 100 carries a solenoid winding 111 having less turns than and connected in series with the winding 95 through a wire 112. The termini of the windings remote from the wire 112 are connected by wires 113 and 114 to the line 115 which leads to the transmitting station T provided with any means for transmitting a signal, such as a hand-operated magneto generator 116.

The winding 111 has its termini further connected by wires 117 and 118 to opposite sides of a normally open, delayed-action switch 119 which is mounted to the base plate by a bracket 120. The switch has a pair of insulated resilient leaves 121, 122, carrying the contact elements 123, which are normally separated by an insulated leaf spring 124. The leaf 122 carries a weight 125 and the leaf 121 has an insulated abutment 126 positioned to be engaged by the end of the arm 86 when the armature 87 is moved to its attracted, solid line position. It is evident that when the contacts 123 are together the winding 111 is short-circuited by the delayed-action switch. When the armature 87 is released, in dotted line position, the arm 86 is away from the abutment 126 and the contacts 123 are separated by the action of spring 124. When the armature is attracted the arm 86 strikes the abutment 126 the leaf 121 and spring 124 are flexed, bringing the contacts 123 together; this also flexes the leaf 122 and the inertia of the weight 125 causes the latter leaf to move away from the arm 86 to open the contacts. The weight 125 thus sets up a series of vibrations or oscillations, resulting in a series of momentary contacts between the contacts 123 until the oscillations are damped out. The winding 111 is, therefore, not short-circuited by any sustained circuit until the vibrations cease, which may occur in from one to four seconds, depending upon the stiffness and length of the leaf 122 and the weight 125.

The local signal circuit comprises a battery 127 and bell 128 connected in series between ground and the insulated holding arm 108, the latter connection being through a wire 129. The code plate is electrically connected to the pin 110 and to the base plate 70 which acts as the ground.

D. *Operation of the second embodiment*

This device is suitable for various types of closed circuit operation, of which two will be illustrated. The circuit 115 may be de-energized prior to operating the device, as indicated at *a*, Fig. 6, or it may be continuously energized; the former situation is more common and will be described in detail. Initially, the code plate 72 is in starting position (extreme clockwise, with pin 74 engaging abutment 75 and the first tooth 76a opposite part 84 of the propelling pawl in the solid line position shown); the fast acting armature 87 is released with the propelling pawl 83 forward (and the part 84 thereof one step toward counter-clockwise of the first tooth 76a) in the dotted line position; the slow-acting armature 97 is in its normal or first position, shown in solid lines; and the contacts 123 of switch 119 are open.

(1) *Magneto generator operation.*—It is preferable (although optional) to precede the transmission of the code by a long, preparatory impulse to insure that the code plate is returned to starting position following a subsequent operation. Such a preparatory signal, generated by cranking the generator 116 for two or more seconds, is indicated between points *b* and *d* in Fig. 6; it energizes both windings 95 and 111, but at first causes only the former to be attracted (through a magnetic circuit including core 90, plates 91 and 92 and the armature 87) to the solid line position, thereby retracting the propelling pawl. The magnetic field of winding 95 also urges the slow-acting armature to the second, dotted line position against the plate 91, but the magnetic field of the winding 111, acting through the core 100, extension 99, the armature 97 and the lower part of plate 92 prevents movement because the armature is initially in this magnetic circuit and closer to extension 99 than to plate 91. Movement of armature 87 causes its arm 86 to strike the insulated abutment 126 on leaf 121, thereby momentarily closing the contacts 123 and setting the leaf 122 and its weight 125 into vibratory motion. Leaf 121 is maintained to the right by arm 86, with spring 124 flexed. While this motion persists the contacts 123 are repeated closed for short periods, insufficient to short circuit the winding 111 effectively. When the vibrations cease—which occurs in a matter of one to several seconds after movement of the arm 86, depending upon the characteristics of the leaf 122 and the weight, which may be selected as desired to suit the speed at which the signals are to be transmitted—the contacts 123 remain closed and winding 111 is continuously short circuited. This occurs at point *c*, Fig. 6, and it should be noted that the preparatory signal *b*—*d* is longer than the damping period *b*—*c* of the switch. The magnetic field of the winding 95 is now unopposed and the slow-acting armature is attracted to its second position; this moves the auxiliary driving member 96 to bring the heel 105 into engagement with the lower end of pin 82 on the retaining pawl 79 and releasing the pawl from the code plate. In this movement the spring 101 maintains the driving member in sliding engagement with abutment pin 103 and the toe 104 of the driving member encounters no pin on the code plate. Movement of the retaining pawl causes the pin 82 thereof to engage the propelling pawl 83 to swing it about its pivot on the arm 86 away from the code plate. The plate is thereby freed to move to starting position in the event that it was not initially in such position. The first notch 76a is now opposite the end 84 of the propelling pawl.

When the generator is stopped at point *d* both armatures are released, thereby retracting the auxiliary driving member, permitting spring 81 to move the retaining pawl against the code plate into operative position, opening switch 119, and advancing the propelling pawl which is moved against the code plate by its spring 88. The latter, however, does not advance the code plate because it was, at the beginning of its stroke, away from the code plate; instead, it moves one step beyond the first notch 76a. The device is now ready to receive a code; when the optional preparatory impulse is omitted, the operation begins with the elements in this condition.

The code for this plate is 3—5—4. The first integer signal is transmitted by operating the generator and making three interruptions, as indicated between points *e* and *f*, Fig. 6. (This may also be described as transmitting three short impulses.) The durations of the interruptions are of no importance; however, the impulses between interruptions should be shorter than the damping period of the vibrating switch, indicated from *b* to *c*. This last condition insures that the armature 97 remains in its first position throughout the integer signal. When the windings are energized at point *e* fast acting armature 87 is attracted to its solid line position, thereby setting the vibrating switch in motion and moving the part 84 of the propelling pawl into the first notch 76a. During the first current interruption following point *e* the propelling pawl advances the code plate one step, and when the windings are again energized the propelling pawl is retracted and the switch is given another impulse to vibrate the leaf 122. This action is repeated until the plate has been advanced three steps. At time *f* the code plate is in its first "A" position, with pin 78a is in alignment with the toe 104 of the auxiliary driving member, and energization of winding 95 at this time causes the propelling pawl to be retracted with the part 84 thereof in the notch immediately to counter-clockwise of the first blocking deflector 77a. The current is maintained between points *f* and *h* for a time longer than the damping period of the switch, and when the switch stops vibrating at point *g* the slow-acting armature moves to its second position. This actuates the driving member 96 to engage the toe 104 with pin 78a and advances the code plate until the driving member engages pin 103a, i. e., two steps, to its first "C" position, with the deflector 77a beyond the part 84 of the propelling pawl, permitting the latter to enter the first notch beyond the deflector. (This action is illustrated and described with reference to the second blocking deflector 77b in the next paragraph.)

The second integer signal comprises five current interruptions occurring between points *h* and *i*. (This may also be described as transmitting four short electrical impulses.) When the current is first interrupted at *h* driving member 96 is retracted but the plate is retained in advanced position by the retaining pawl. Armature 87 is also released to advance the propelling pawl, thereby advancing the plate one step, it being noted in this instance the retaining and propelling pawls are already in engagement with the code plate when the first interruption occurs. At the end of five such interruptions the code plate is advanced five steps to its second "A" position (ten steps from starting position), which is the position shown in solid lines in the drawing, and when the steady current is resumed at *i* the propelling pawl moves into the notch immediately to the left of the second blocking deflector 77b as shown in solid lines. When the switch stops vibrating at point *j* the armature 97 moves to second position and the toe 104 of the auxiliary driving member 96 engages the pin 78*b*, thereby advancing the code plate two steps to the dotted line position, which is the second "C" position. Movement is again limited by engagement of the member 96 with the pin 103*a*. As is shown in the drawing, the part 84 is now in the first notch beyond the deflector 77*b*.

The third integer signal comprises four current interruptions occurring between points *k* and *l*. The code plate is thereby advanced four steps by the operations described in the foregoing paragraph, to bring the plate to its third "A" position with the pin 110 in alignment with the pin 109, as shown in dotted lines. When the switch stops vibrating, at a time indicated by point *k*, the armature 97 starts to move to its second position, thereby swinging the holding arm 108 and pin 109 radially in with respect to the code plate. The pin 109 engages pin 110 after only a limited movement has occurred, thereby arresting completion of the movement of the armature and preventing the retaining pawl 79 from being moved to inoperative position. The code plate is, therefore, retained in its ultimate position which, in this embodiment, coincides with the third "A" position. It also establishes electrical contact between the insulated pin 109 and grounded pin 110, thereby closing the signal circuit through wire 129, battery 127 and bell 128.

To stop the local signal at the receiving station the transmitting signal is interrupted, as indicated at *m*, by any desired means thereby causing the propelling pawl to advance the code plate one step and moving the pin 110 away from pin 109. The device may be left in this condition, or a further long or "ring off" signal, indicated between points *n* and *p*, may be transmitted; the latter will cause the auxiliary driving member to move at a time indicated by point *o* to release the retaining pawl and permit the code plate to return to starting position, the pin 110 being free to pass radially outside of the pin 109.

Should either of the first two integer signals be smaller than those described above, the code plate would not be advanced to the "A" positions, and when the auxiliary driving member 96 is moved it would not encounter a pin 78*a* or 78*b*; hence it would slide along the pin 103, bringing its heel 105 against the pin 82 and releasing the retaining pawl to return the plate to starting position under influence of spring 73. Should either of these signals be too large, the plate would be advanced one step beyond the respective "A" position, into the corresponding "B" position; further advancement would be prevented by the corresponding blocking deflector, which prevents the entry of the part 84 of the pawl into a notch. At the end of such a larger signal the auxiliary driving member would similarly move the retaining pawl to permit the plate to return to starting position. Should the third integer signal be either too small or too large the pin 110 would not be aligned with the pin 109, and the stroke of the slow-acting armature at point *k* would not be arrested; the auxiliary driving member would, therefore, again engage the pin 82 and move the retaining pawl to permit return of the code plate to starting position.

(2) *Dial operation.*—The device of Fig. 5 may also be operated by a dial at the transmitting station, as shown in Fig. 7. In this instance the transmitting station comprises a battery 63, a normally open, telephone receiver actuated switch 64, a normally closed dial-controlled switch 65*a*, connected in series with the line circuit 115. Switch 65*a* is actuated by a dial mechanism 66*a* to open the circuit a succession of times equal to the integer, the integer "0" being transmitted by ten interruptions. The code for this device, when controlled by the transmitting station of Fig. 7, is 4—5—4, and Fig. 6 again represents the operation. It is evident that a switch 119 having a shorter damping period would be used in this instance.

The circuit 115 is initially de-energized, as indicated at *a*, Fig. 6. When the receiver at the transmitting station is lifted switch 64 is closed and a steady potential is applied to line 115, as indicated at *b*, Fig. 6. When the number "4" is dialled the current is interrupted four times, between points *d* and *f*; subsequent dialling of "5" and "4" causes five and four interruptions, between points *h* and *i* and between points *k* and *i*, respectively. The action taking place at the receiver is that previously described with reference to magneto operation.

E. *Description of third embodiment—Figs. 8 to 14*

The selector shown in Figs. 8 to 14 is adapted for open circuit type operation. It comprises a bed plate 130 of non-conductive and non-magnetic material, such as plastic, to which a laminated magnet core 131 is secured by means of screws engaging transverse plates 132 and 133 at the ends. These plates, as well as intermediate plate 134, are made of material having high magnetic permeability. A solenoid winding 135 surrounds the core between the plates 133 and 134, and a lug 136 of conductive material surrounds the part of the core between the plates 132 and 134. The winding 135 is energized by a circuit 137 connected to a transmitting station T having any suitable means for transmitting the code, such as an electric battery 138 connected through normally open switches 139 and 140 to the circuit. Switch 139 is closed whenever the receiver is removed from its support, and the switch 140 is closed by the dial mechanism 141 in the manner previously described for the first embodiment, e. g., to close the circuit in rapid succession a number of times exceeding by one the value of the integer being transmitted, the integer zero being transmitted by eleven impulses.

The fast-acting armature 142 is in the form of a plate mounted on a vertical hinge pivot 143 supported by the plate 134 and urged in a clockwise direction by a leaf spring 144 against a stop 145 which is, in turn, carried by an extension 133*a* of the plate 133. When the winding 135 is energized a magnetic circuit is established through the core 131, the plates 133 and 134 and the armature 142 to move the armature in a counter-clockwise direction. The armature is released and moves in a clockwise direction immediately upon de-energization of the winding. The slow-acting armature 146 is in the form of a plate mounted on a horizontal hinge pivot 147 near the bottom of the magnet and carried by the end plates 132 and 133. It is urged by a leaf spring 148 to a position away from the magnet. When the winding 135 is energized magnetic circuits are established through the core 131, the plates 133 and 134, and the armature 146, and also through the core, the plates 132 and 134 and the armature, thereby attracting the armature. When the winding 135 is energized the armature is attracted; when it is de-energized the decay of the magnetic flux through the latter circuit is delayed by the action of the lug 136 and the armature does not move away from the magnet until a short time of the order of half a second has elapsed.

A table plate 149 is mounted on the top of the magnet by screws. It carries a vertical shaft 150 forming a journal for the code plate 151 which is urged in a clockwise direction by a coiled spring 152 to starting position, with pin 153 on the plate in engagement with stationary abutment pin 154 on the table plate 149. The code plate has teeth 155 at its periphery and a ring of internally threaded holes 156 located radially inward from the respective teeth. A retaining pawl 157 is pivotally mounted on a vertical post 158 which is mounted on the plate 149 and carries a coiled spring 159 urging the pawl in counter-clockwise direction against the code plate for holding the latter in advanced position after the plate has been advanced.

An arm 160 is ragidly secured to the top of the fast-acting armature and extends diagonally under the code plate to the point 161, at which it is bent upwardly. The propelling pawl 162 extends beneath the code plate and has the ends thereof bent upwardly; one end receives pivotal support in the end of the arm 160 at 161. A coiled spring 163 urges the pawl in a clockwise direction with respect to the arm 160 and urges the other end 164 of the pawl against the code plate.

Movement of the slow-acting armature 146 away from the magnet is limited by a stop 165 which is secured to the plate 149. A bracket 166 is secured to the top of this armature and has the top thereof bent to extend horizontally between the plates 149 and 151 for movement together with the armature. The auxiliary driving member 167 is pivotally mounted to the bracket 166 about a vertical pivot 168 and is urged in a clockwise direction by means of a spring 169 against an upstanding lug 170 which is integral with the bracket. This driving member has an upright toe 171 formed with a slightly concave engaging surface directed radially outwardly with respect to the code plate for engaging pins depending from the plate, to be described. The driving member further has a heel 172 positioned to engage the retaining pawl 157 to move it away from the code plate when the slow-acting armature, bracket 166 and driving member are moved away from the magnet with the driving member 167 in the illustrated position in engagement with the lug 170. The driving member further has a part thereof formed as a curved cam surface 173 disposed to engage the radially inner side of the end 164 of the propelling pawl. This surface pushes the propelling pawl away from the code plate when the armature, bracket and driving member are moved away from the magnet with the driving member 167 in the illustrated position. Both the heel 172 and the part providing the cam surface 173 are narrow, whereby they are clear of the retaining pawl 157 and of the propelling pawl, respectively, when the driving member is rotated in a counter-clockwise direction, away from the lug 170.

A post 174 is optionally mounted on the plate 149 to limit the propelling stroke of the propelling pawl.

Two blocking deflectors 175*a* and 175*b* are mounted on the code plate. These deflectors are shown in detail in Figs. 11 to 13 and have lower horizontal portions 176 resting on the upper face of the code plate; upright portions 177; and upper horizontal portions 178. The latter have the edges thereof which are radially outward with respect to the code plate disposed at about the maximum diameter of the code plate so as to prevent the entry of the vertical part 164 of the propelling pawl into the notches between the teeth at the blocked positions on the plate. Because the upper portions 178 are elevated above the code plate they do not interfere with the action of the retaining pawl 157, which is low enough to enter the notches beneath the deflector. The lower portions 176 have holes through which screws 179*a* or 179*b* extend, these screws being threadedly secured in selected holes 156 in accordance with the code to which the plate is adjusted and extending beneath the code plate to form pins for cooperation with the toe 171 of the auxiliary driving member. The driving member 167 is located circumferentially with respect to the shaft 150 to have the toe 171 thereof in alignment with one of these screws in each of the first two "A" positions of the code plate. It will be noted that in this embodiment only two deflectors are provided, i. e., the plate has only two blocked "B" positions. However, the device is intended for the reception of a code consisting of three integer signals, and a third pin 180 extending upwardly above the code plate is threadedly mounted in an appropriate hole 156 to complete the final operation of the device in a manner to be described. Should the selected code be such that the pin 180 is in a hole already occupied by a screw 179*a* or 179*b*, the screw is replaced by a longer screw which extends above the code plate to function also as the third pin.

A bracket 181 is rigidly mounted on the slow-acting armature and electrically insulated therefrom. This bracket has a horizontal part 182 and a downturned part 183 forming one element of an electrical contact as well as a movable abutment cooperating with the pin 180. The part 183 is radially within the circular path of the pin 180 when the armature 146 is in its attracted position and radially outside of the path when the armature is released. The pin 180 is located circumferentially on the code plate so as to be opposite to the part 183 when the code plate is in the final "A" position, i. e., the "A" position corresponding to the third correct integer signal. When the code plate is in this position at the end of the third integer signal, the part 183 engages the pin 180 during the first part of the outward movement of the slow-acting armature 146 and arrest further movement of the armature away from the magnet. This, in turn, prevents the bracket 166 and auxiliary driving member 167 from moving out to release and push the pawls 157 and 162 away from the code plate. The code plate is thereby retained in its ultimate position which, in this embodiment, coincides with the last "A" position.

The bracket 181 is electrically connected to a wire 184 which may be connected to any suitable signal device, such as a bell 185. The pin 180 is grounded to the selector and the frame of the latter is connected through a wire 186 and battery 187 to the signal device. It is evident that when the part 183 engages the pin 180 the signal circuit is closed to operate the signal device.

F. *Operation of the third embodiment*

The third embodiment is shown in the drawings to be set to respond to the code 4—3—6, transmitted as a series of current impulses of the type illustrated in Fig. 4. When switch 139 is closed and the first integer "4" is dialled in the mechanism 141 the switch 140 is closed five times and five electrical impulses are transmitted over the circuit 137 and the winding 135 is energized five times in rapid succession. During the first impulse the armatures 142 and 146 are both attracted and the propelling pawl makes a forward stroke. However, during the first stroke the cam surface 173 prevents engagement of the part 164 of the propelling pawl 162 with the teeth of the code plate, and the plate is not advanced. Attraction of the armature 146 causes the auxiliary driving member 167 to move radially inwardly to permit the retaining pawl 157 to move to operative position; it thereby also retracts the cam surface 173 and permits the propelling pawl to engage the teeth. The four intervals between the five impulses are of such short durations that the slow-acting armature 146 remains attracted until a short time after the completion of the last impulse because of the lug 136; the fast-acting armature 142, however, moves in synchronism with the pulses. As a result the propelling pawl makes a total of five reciprocations and advances the code plate one step in each of the four strokes subsequent to the first stroke; this moves the plate to the first "A" position, with the end 164 of the propelling pawl in the notch immediately ahead of the first blocking deflector 175*a* when the pawl is retracted at the end of the fifth impulse.

After the fifth impulse the current is interrupted for a time sufficient to release the armature 146, which moves into engagement with the stop 165. This movement carries the bracket 166 and auxiliary driving member 167 radially outward with respect to the plate toward the position shown in the drawings. In the early part of this outward movement the toe 171 of the driving member engages the first depending engaging pin 179*a*. Because the line from the pivot 168 to the toe 171 is inclined toward counter-clockwise with respect to the radius through the pivot, continued outward movement causes the driving member 167 to turn in a counter-clockwise direction about its pivot 168 to advance the code plate two steps, past the first "B" position and to the first "C" position. As a result of this turning of the driving member the heel 172 thereof is swung to counter-clockwise of the retaining pawl 157, whereby the latter is not engaged but remains in operative position against the plate. Similarly, the cam surface 173 is moved clear of the end 164 of the propelling pawl, whereby the latter remains in engagement with the code plate during the advancement of the latter and the end 164 enters the first notch in the plate beyond the first blocking deflector 175*a*.

When the second integer "3" is dialled four electrical impulses are transmitted and the action described above for the first integer is repeated with the difference that the plate is advanced already with the first impulse because the propelling pawl is initially in engagement with the code plate. When the armature 146 is attracted at the beginning of the first impulse the auxiliary driving member 167 is retracted from the pin 179*a* and is rotated clockwise by its spring 169 against lug 170, thereby assuming the position it had during the transmission of the first integer signal. The code plate is, therefore, advanced four steps to the second "A" position during the transmission of the signal, and is further advanced two steps to the second "C" position by the auxiliary driving member which engages the second contact pin 179*b* during the pause which follows this signal.

When the third integer "6" is dialled seven electrical impulses are transmitted and the action described in the foregoing paragraph is repeated up to the point where the impulses end and the plate has been advanced seven steps to the third "A" position. This position is, in this embodiment, identical with the ultimate position. After the last impulse is completed and the fast-acting armature is released the slow-acting armature is released, but the auxiliary driving member does not encounter any depending pin and does not advance the plate. Instead, the downturned part 183 of the bracket 181 strikes the radially inner side of the third pin 180, which is now opposite the bracket, thereby preventing completion of the outward movement of the slow-acting armature. This prevents the heel 172 of the auxiliary driving member from striking the retaining pawl 157, whereby the code plate is retained in the ultimate position. Engagement of the pin 180 closes the electrical local signal circuit which includes the insulated bracket 181, wire 184, bell 185, battery 187, wire 186 and the grounded pin 180.

To return the code plate to starting position any signal, such as a single or a pair of impulses, which may be generated at the transmitting or at the receiving station, is applied to the winding; this attracts the armature 146 to retract part 183 from the pin 180 and advances the code plate one or two steps, respectively, beyond the ultimate position. At the cessation of this signal the armature 146 is released, carrying the auxiliary driving member 167 radially out and causing the heel 172 thereof to engage the retaining pawl and move it into inoperative position. The cam surface 173 simultaneously moves the propelling pawl away from the code plate. The part 183 of the bracket is thereby moved radially outward from the circular line of travel of the pin 180, and the code plate is thereby freed to return to starting position under the influence of its spring 152.

Should either of the first two integer signals be smaller than those described above, the code plate would not be advanced to the corresponding "A" positions at the end of the last impulse, and when the armature 146 is released the auxiliary driving member would not encounter a depending pin 179*a* or 179*b*; hence the member would not rotate about its pin 168 but the heel 172 would engage the retaining pawl, thereby freeing the code plate for movement to starting position under the influence of the spring 152. Should either of these signals be too large, the code plate would be advanced one step beyond the respective "A" position into the corresponding "B" position; further advancement would be prevented by the corresponding blocking deflector which prevents the entry of the propelling pawl into a notch. At the end of such a large signal the auxiliary driving member would similarly free the code plate for return to starting position. Should the third integer signal be either too small or too large the pin 180 would not be aligned with the part 183 of the bracket 181 at the end of the last impulse and the outward movement of the slow-acting armature would not be arrested; the auxiliary driving member would, therefore, similarly free the code plate for return to starting position.

I claim as my invention:

1. In a code selective device, the combination of a code plate; propelling means for advancing the plate a controlled distance; blocking means for rendering said propelling means inoperative when the code plate is in a predetermined blocked position; and auxiliary driving means for advancing said plate beyond said blocked position only from a predetermined position of the code plate.

2. In a code selective device, the combination of a code plate; propelling means for advancing the plate; means for actuating the propelling means to advance the plate a controlled distance; blocking means for rendering said propelling means inoperative when the code plate is in a predetermined blocked position; auxiliary drive means for advancing said plate beyond said blocked position only from a predetermined position of the code plate; and means for actuating said auxiliary driving means to advance the plate following the operation of said propelling means.

3. The combination according to claim 2 wherein the plate has an engageable abutment and the auxiliary driving means comprises a movable driving member with an engaging toe adapted to engage the abutment when the code plate is in said other prodetermined position.

4. In a code selective device, the combination of a code plate; means biasing said plate toward a starting position; propelling means for advancing the plate from starting position; retaining means cooperating with said plate and having an operative position for retaining the plate in an advanced position and an inoperative position permitting retrograde movement of the plate; means for moving said retaining means to operative position; blocking means for rendering said propelling means inoperative when the code plate is in a predetermined blocked position; and auxiliary driving means for advancing said plate beyond said blocked position only from another predetermined position of the code plate in advance of said blocked position and for moving said retaining means to inoperative position to free the code plate for retrograde movement when the plate is at a position other than said other predetermined position when the auxiliary driving means is operated.

5. The combination according to claim 4 wherein the plate has an engageable abutment and the auxiliary driving means comprises a driving member mounted for rotation and reciprocation and having an engaging toe and an engaging heel, said heel being disposed to engage an element of said retaining means to move the latter to inoperative position upon operation of the auxiliary driving means and said engageable abutment on the plate being positioned thereon to be in alignment with said toe when the plate is in said other predetermined position for driving engagement of said toe with said abutment upon said operation, said toe being disposed with respect to the mounting of the driving member to cause rotation of said member upon engagement with said abutment to move the heel out of engaging position with respect to said element of the retaining means.

6. In a code selective device, the combination of a code plate having serrations; means biasing said plate toward a starting position; reciprocable propelling means adapted to engage said serrations for advancing the plate stepwise from starting position; means for reciprocating said propelling means; retaining means cooperating with said plate having an operative position for retaining the plate in successive advance positions and an inoperative position permitting retrograde movement of the plate; means for moving said retaining means to operative position; blocking means on said plate covering one or more of said serrations to prevent driving engagement of the propelling means when the plate is in a predetermined blocked position; an auxiliary driving member pivotally mounted on a reciprocable support having a toe and a heel; means urging said driving member about its pivot to a normal position with the heel in alignment with an element of the retaining means for moving the retaining means to inoperative position when the reciprocable support is actuated; an abutment on the code plate positioned to be in alignment with the toe of the driving member when the code plate is in a second predetermined position in advance of said blocked position, said toe and pivotal mounting being disposed to advance the plate beyond the blocked position and to rotate the driving member to displace the heel thereof away from said element of the retaining pawl when the reciprocable support is actuated and the abutment is engaged; and means for actuating said reciprocable support subsequently to operation of said propelling means.

7. In a code selective device adapted to respond to a composite code comprising a plurality of integer signals, the combination of a code plate; propelling means for advancing the plate during the reception of each integer signal for a controlled distance determined by the magnitude of the signal; blocking means for rendering said propelling means inoperative when the code plate is in a predetermined blocked position; auxiliary driving means for advancing said plate beyond said blocked position only from a second predetermined position of the code plate; means for actuating said auxiliary driving means after the reception of an integer signal; and means for operating a controlled device when the code plate is advanced to a predetermined third position after the reception of the last integer signal of said composite code.

8. In a code selective device adapted to respond to a composite code comprising a plurality of integer signals, the combination of a code plate having a series of serrations; means biasing said plate toward a starting position; propelling means having a reciprocable element adapted to engage said serrations for advancing the plate stepwise from starting position; means for actuating the propelling means during the reception of each integer signal to advance the plate a number of steps determined by the magnitude of the signal; retaining means cooperating with said plate having an operative position for retaining the plate in successive advanced positions and an inoperative position permitting retrograde movement of the plate; means for moving said retaining means to operative position; blocking means for rendering said propelling means inoperative when the plate is in a predetermined blocked position; control means for moving the retaining means to inoperative position and free the plate for retrograde movement at the end of each integer signal following the operation of the propelling means except when the said operation of the propelling means advanced the plate to one of several correct predetermined positions in accordance with the said code, at least one of said correct predetermined positions being in advance of and near to said blocked position; means for advancing the plate beyond said blocked position from said one correct predetermined position at the end of an integer signal; and means for maintaining the code plate in advanced position when the code plate is advanced to the last of said correct predetermined positions at the end of the last integer signal.

9. The combination according to claim 8 wherein the means for maintaining the code plate in advanced position comprises an engagement member movable with the said control means for moving the retaining means to inoperative position and a cooperating abutment member on the code plate positioned thereon to be in alignment with the said engagement member when the code plate is in said last correct predetermined position for arresting the movement of the said control means and preventing movement of the retaining means to inoperative position.

10. The combination according to claim 9 wherein the said engagement member and cooperating abutment member form contact elements of an electrical switch, at least one of said members being electrically insulated from the code plate and said members being connected to a controlled circuit.

11. In a code selective device adapted to respond to a composite code comprising a plurality of electrical integer signals, the combination of a serrated code plate having a starting position, at least two advanced "A" positions corresponding to positions of the plate consequent upon the reception of successive correct integer signals, a blocked "B" position immediately beyond the first "A" position, and a "C" position beyond said "B" position; resilient means urging said plate to starting position; a reciprocable propelling pawl having an engaging part engageable with said serrations for advancing the plate stepwise from starting position; a retaining pawl cooperating with said plate for retaining the plate in successive advanced positions; means urging said retaining pawl into operative position; a blocking deflector on the plate positioned to prevent driving engagement of the propelling pawl with the serrations when the plate is in said "B" position; electromagnetic means comprising a fast acting armature for reciprocating said propelling pawl in synchronism with current alternations of said integer signals; an auxiliary driving member mounted for reciprocating movement between first and second locations and supported for movement independent of said reciprocating movement to have a normal and a displaced position; an engaging toe and an engaging heel on said auxiliary driving member, said heel being positioned to engage an element of said retaining pawl when the driving member is in the normal position thereof for moving the said pawl to inoperative position and free the plate for retrograde movement when actuated for movement from said first to said second location while in normal position; abutment means on the code plate positioned to be in alignment with the toe of the driving member when the latter is in normal position and the plate is in the first "A" position and adapted to be engaged by said toe when the driving member is moved from first to second location to advance the code plate from the said "A" position past the "B" position to the said "C" position, the toe being positioned so that the driving member is moved from normal position to the displaced position thereof during such advancement to prevent engagement of the heel with the element of the retaining pawl; electromagnetic means including a slow acting armature for holding said auxiliary driving member in said first location during the reception of said integer signals and for moving the auxiliary driving member to the second location subsequent to the completion of each integer signal; and means for operating a controlled device when the code plate is advanced to the last "A" position at the end of the last integer signal.

12. In combination with the device according to claim 11, an engagement member movable with said slow acting armature; and an abutment member on said code plate positioned thereon to be in alignment with the said engagement member when the code plate is in the said last "A" position for arresting the movement of said slow acting armature and preventing movement of the auxiliary driving to the second location thereof at the end of the last integer signal.

13. In a code selective device adapted to respond to a composite code comprising a plurality of electrical integer signals, the combination of a serrated code plate having a starting position, at least two advanced "A" positions corresponding to positions of the plate consequent upon the reception of successive correct integer signals, a blocked "B" position immediately beyond the first "A" position, and a "C" position beyond the said "B" position; resilient means urging said plate to starting position; a reciprocable propelling pawl having an engaging part engageable with said serrations for advancing the plate stepwise from starting position and pivotally mounted for movement away from said plate; resilient means urging said pawl into engagement with the plate; a retaining pawl cooperating with said plate for retaining the plate in successive advanced positions; means urging said retaining pawl into operative position; a blocking deflector on the plate positioned to prevent driving engagement of the propelling pawl with the serrations when the plate is in said "B" position; electromagnetic means comprising a fast acting armature for reciprocating said propelling pawl in synchronism with current alternations of said integer signals; a slow acting armature movable between first and second locations; electromagnetic means for holding said slow acting armature in the first location during the reception of an integer signal and for moving it to second location after the completion of an integer signal; an auxiliary driving member movably mounted for reciprocation with said slow moving armature and movable with respect thereto between a normal position and a displaced position; engagement means on said auxiliary driving member for moving said propelling and retaining pawls away from the plate when the slow moving armature is moved from the first to the second location while the driving member is in the normal position, said means being located to be ineffective when the driving member is in the displaced position; an engaging toe on the auxiliary driving member; an abutment means on the code plate positioned thereon to be in alignment with said engaging toe when the code plate is in the first "A" position, said engaging toe being located to advance the code plate past the "B" position to the said "C" position and to move the auxiliary driving member to the displaced position when the slow moving armature is moved from the first to the second location; and means for preventing engagement of the auxiliary driving member with the retaining pawl at the end of the last integer signal when the plate is advanced to the last "A" position at the end of said last signal.

14. The device according to claim 13 wherein the said means for preventing engagement of the auxiliary driving member with the retaining pawl comprises a second abutment means on the code plate positioned for alignment with the toe of the auxiliary driving member at said last "A" position.

15. The device according to claim 13 wherein the auxiliary driving member comprises resilient means urging it to said normal position; and the said means for moving the retaining and propelling pawls away from the plate comprises a heel on the driving member located for engagement with the retaining pawl and a cam surface adapted to engage the propelling pawl.

16. The device according to claim 13 wherein the electromagnetic means for moving the slow acting armature comprises a pair of windings connected in series, the first winding having a magnet controlling the fast acting armature and urging the slow acting armature to the second location and the second winding having a magnet attracting the slow acting armature to the first location; resilient means normally urging the slow acting armature to the first location; a normally open time delay switch connected across the second winding; and means actuated by the operation of the fast acting armature for closing the switch at a time interval after movement of the fast acting armature.

17. The device according to claim 16 wherein the switch is a vibrating switch having an element adapted for vibrations and carrying an electrical contact for intermittently short circuiting the second winding while said member is vibrating and for short circuiting said winding continuously upon cessations of said vibrations.

HAROLD A. STICKEL.

REFERENCES CITED

The following references are of record in the file of this patent:

UNITED STATES PATENTS

| Number | Name | Date |
|---|---|---|
| 2,359,494 | Stickel | Oct. 3, 1944 |
| 2,382,487 | Kenny et al. | Aug. 14, 1945 |
| 2,382,488 | Kenny et al. | Aug. 14, 1945 |